United States Patent [19]
Wong-Insley

[11] Patent Number: 6,122,745
[45] Date of Patent: Sep. 19, 2000

[54] METHOD AND APPARATUS FOR MANAGING POWER CONSUMPTION IN DATA PROCESSING SYSTEMS

[75] Inventor: Becky H. Wong-Insley, Sunnyvale, Calif.

[73] Assignee: Sun Microsystems Incorporated, Palo Alto, Calif.

[21] Appl. No.: 09/224,437

[22] Filed: Dec. 31, 1998

[51] Int. Cl.[7] ...................................................... G06F 1/26
[52] U.S. Cl. ........................... 713/300; 713/320; 713/330
[58] Field of Search ................... 713/300–340, 713/201; 709/1, 101, 100, 302; 706/295

[56] References Cited

U.S. PATENT DOCUMENTS

| 5,638,541 | 6/1997 | Sadashivaiah | 713/300 |
| 5,675,814 | 10/1992 | Pearce | 713/300 |
| 5,974,556 | 10/1999 | Jackson et al. | 713/322 |

OTHER PUBLICATIONS http://www.intel.dk/design/mobile/acpi/acpi_spec.pdf.
http://stores.us.ohio-state.edu/~steen/ecotips/oct95.html.
http://www.epa.gov/energystar.html.
http://www.epa.gov/appdstar/esoe/pclist.html.
http://www.ega.gov/appdstar/esoe/pcsum.html.
http://www.epa.gov/office.html.
http://www.teleport.com/~acpi/papers/imple3/.
http://www.microsoft.com/misc./nonms.htm.
http://www.epa.microsoft.com/hwdev/pcfuture/acpifaq2.htm.

*Primary Examiner*—Ario Etienne
*Attorney, Agent, or Firm*—O'Melveny & Myers LLP

[57] ABSTRACT

A method and apparatus for performing power management in a Java operating system environment is disclosed in which a state change request having a value and a type is received, wherein the value is associated with a power management state, and the type is one of a system or a device. The type of the state change request is determined and the request is processed in accordance with the state change request type. The power management state is changed in accordance with the processed request.

19 Claims, 5 Drawing Sheets

Data Processing System

Power Management Software Layers

METHOD AND APPARATUS FOR MANAGING POWER CONSUMPTION IN DATA PROCESSING SYSTEMS

RELATED APPLICATIONS

The following related U.S. application is hereby incorporated by reference: U.S. application Ser. No. 09/042,211, entitled, "Java Application Level Power Management Framework", by Becky Wong-Insley, filed on Mar. 13, 1998.

FIELD OF THE INVENTION

This application relates to managing power consumption in data processing systems and, specifically, to a method and apparatus for performing power management in a Java operating system environment.

BACKGROUND OF THE INVENTION

Power management schemes are useful for regulating the power consumption of data processing systems such as computers, mobile devices, and embedded devices. The objective of power management is to control the power usage of a system based on system activities, and ultimately, to reduce power consumption and to provide longer operating times.

Conventional methods for managing power consumption in computer systems are typically operating system and hardware dependent. Such conventional methods include the Advanced Configuration and Power Interface (ACPI) initiative. ACPI is a power management scheme that is targeted for x86 hardware and Windows platforms, including Win32, Win95, Win98, NT and their future releases.

The Java computing environment has been widely adapted by different classes of devices such as desktop systems, network computers, mobile devices and embedded devices. Power management is an essential feature for mobile devices but the other classes of devices can also take advantage of similar functions. ACPI is specially designed for the x86 hardware and the Windows operating environment. Currently there is no power management architecture existing for the Java operating environment. "Sun," the Sun logo, "Sun Microsystems", "Java" and all Java-based trademarks and logos are trademarks or registered trademarks of Sun Microsystems, Inc. in the United States and other countries.

Therefore, a need exists for a method and apparatus for performing and implementing a hardware-independent power management framework suitable for the Java operating environment.

SUMMARY OF THE INVENTION

An embodiment consistent with the present invention provides a method and apparatus for managing power consumption of computer systems.

In accordance with the purpose of the invention, as embodied and broadly described herein, the invention relates to a method for performing power management in a Java operating system environment. The method includes the step of receiving a state change request having a value and a type, wherein the value is associated with a power management state, and the type is one of a system or a device. The method also includes the step of determining the type of the state change request, processing the request in accordance with the state change request type, and changing the power management state in accordance with the processed request. The method may be applied to any hardware platform that the Java operating system has been ported to.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, sever to explain the principles of the invention.

DETAILED DESCRIPTION OF A PREFERRED EMBODIMENT

Reference will now be made in detail to embodiments of the present invention, examples of which are illustrated in the accompanying drawings. Wherever convenient, the same reference numbers will be used throughout the drawings to refer to the same or like parts.

Data Processing System

Figure 1:
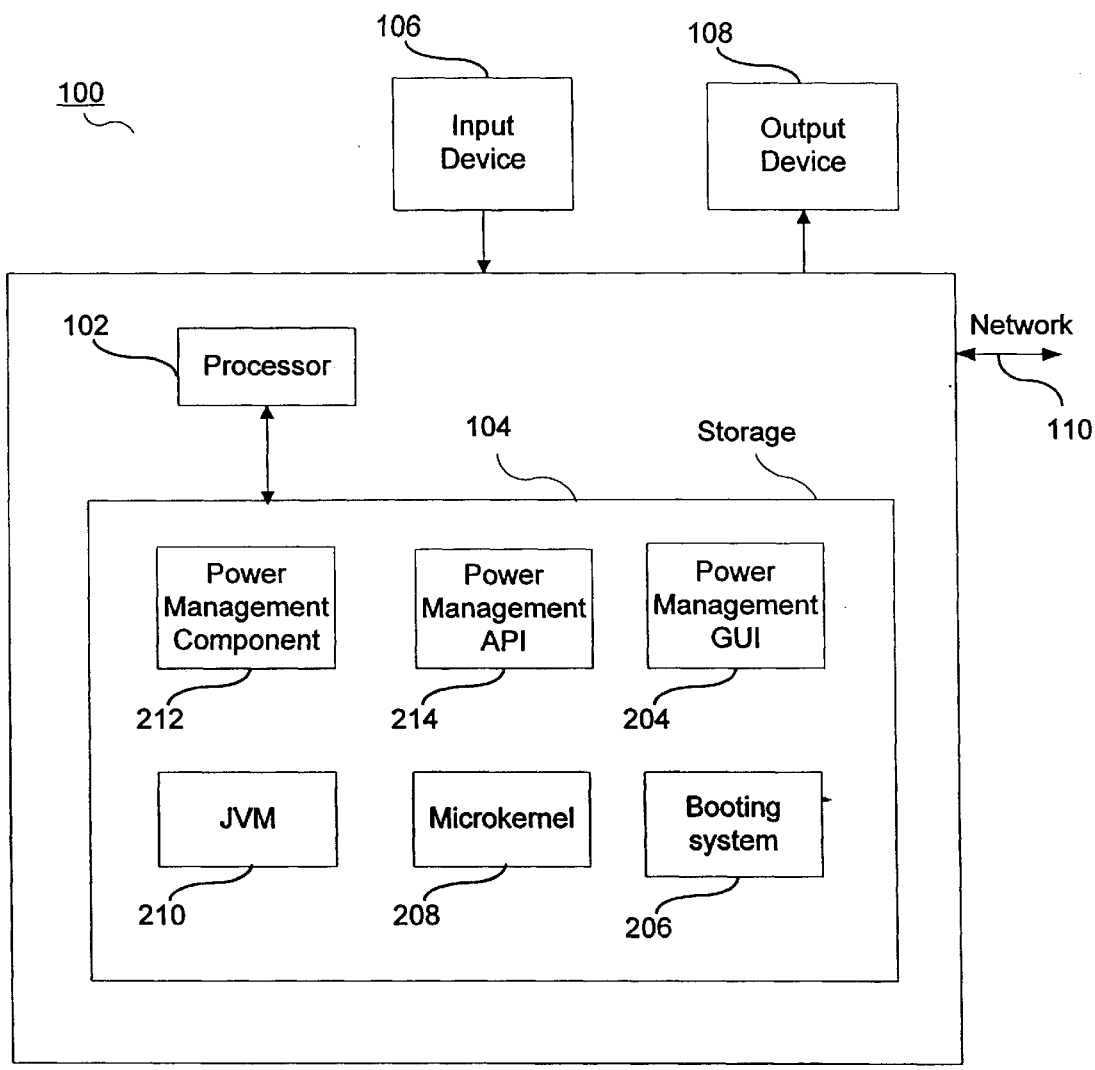
FIG. 1 is a block diagram of a data processing system in accordance with an embodiment of the present invention.

FIG. 1 is a block diagram of a data processing system 100, which is shown as a representative environment for the present invention. Structurally, data processing system 100 includes a processor or processors 102, and a storage area 104. An input device 106 and an output device 108 are connected to processor 102 and storage 104. Input device 106 and output device 108 represent a wide range of varying I/O devices such as disk drives, keyboards, modems, network adapters, printers and displays. A network 110 may also be connected to processor 102 and storage 104.

In the following discussion, it is understood that the appropriate processor 102 (or similar processors) perform the steps of methods and flowcharts discussed preferably executing instructions stored in storage 104. It will also be understood that the invention is not limited to any particular implementation or programming technique and that the invention may be implemented using any appropriate techniques for implementing the functionality described herein. The invention is intended primarily for the Java operating system environment but may be useful in other operating environments. In alternative embodiments, hard-wired circuitry may be used in place of or in combination with software instructions to implement the invention. Programs may include applications and applets. Thus, embodiments of the present invention are not limited to any specific combination of hardware circuitry and software.

Power Management Software Layers

Figure 2:
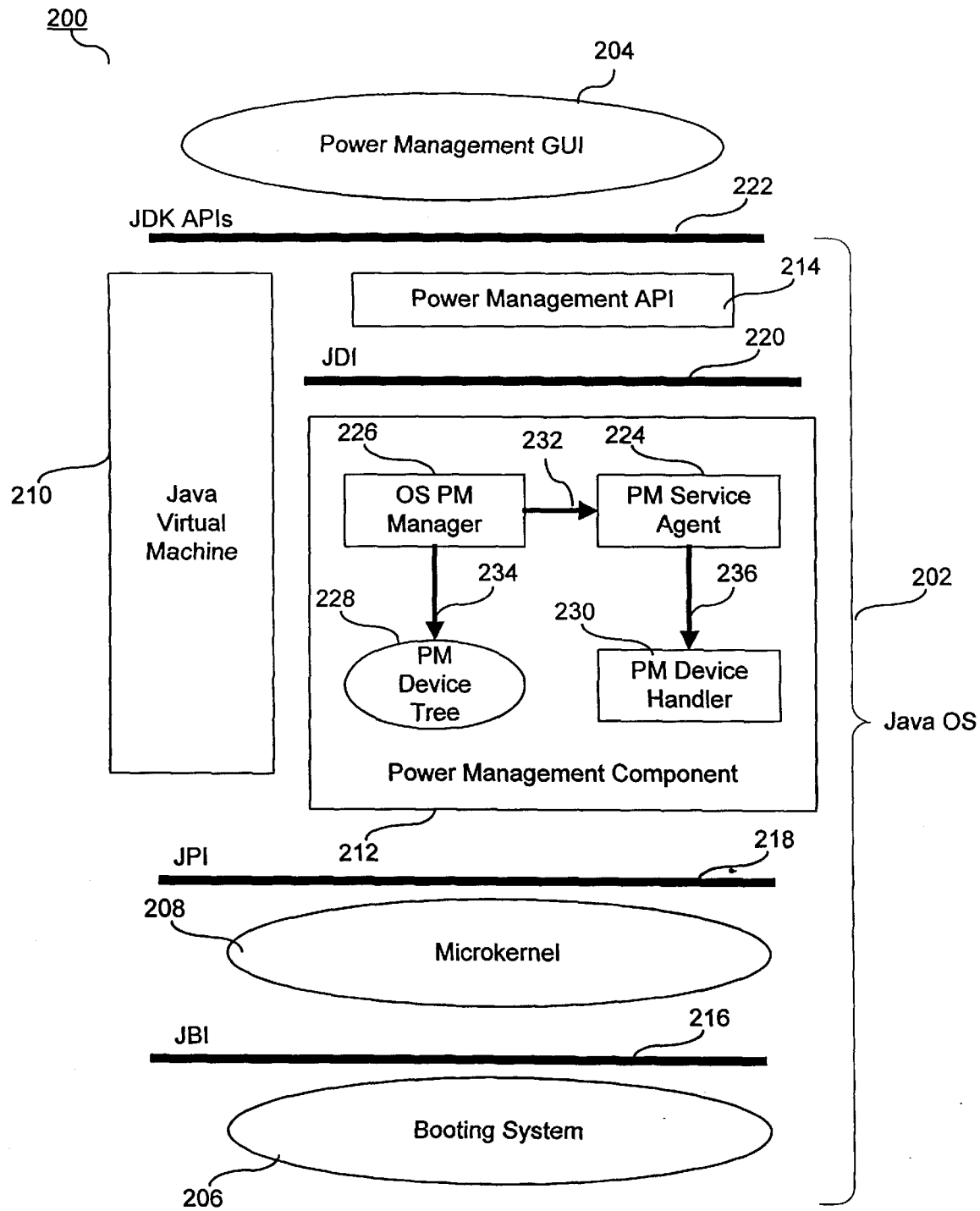
FIG. 2 is a block diagram showing software layers in a data processing system which performs power management in an embodiment of the present invention.

FIG. 2 is a block diagram 200 showing layers of software used in an embodiment of a method and apparatus for power management consistent with the present invention. These layers may include a Java operating system (Java OS) layer 202 and a power management GUI 204. Power management GUI layer 204 may also include applications that make calls to the Java OS 202.

The Java OS layer may include a booting system 206, a microkernel 208, a Java Virtual Machine (JVM) 210, a power management component 212, and power management application programming interface (API) 214. The booting system 206 may communicate with the microkernel 208 via an interface 216 such as the Java Boot Interface (JBI). The microkernel 208 may communicate with the JVM 210 and the power management component 212 via an interface 218 such as the Java Platform Interface (JPI). In turn, the power management component 212 may communicate with the power management APIs 214 via an interface 220 such as the Java Device Interface. The power management component 212 and the JVM 210 do not necessarily need to be connected via a particular interface. They are components of the Java OS that communicate with each other via program code. A power management graphical user interface (GUI) 204, or an application making calls using the GUI 204, may communicate with the Java OS 202 via an interface 222 such as the Java Development Kit Application Programming Interface (JDK API) and the Power Management API.

The Power Management Component

Power management component 212 may include a Power Management (PM) Service Agent 224, a OS PM Manager 226, a PM Device Tree 228, and a PM Device Handler 230. In an embodiment consistent with the present invention, the power management component 212 may be implemented as a Java Device Interface (JDI) service package, which may be invoked when power management is enabled.

If power management is enabled, the PM Service Agent 224 starts the OS PM Manager 226. The OS PM Manager 226 builds the PM Device Tree 228. The PM Device Tree 228 is a subset of the system device tree. The system device tree keeps track of all of the devices on the system, but the PM Device Tree 228 keeps track of power manageable devices. Power manageable devices have device drivers that may implement the power management features that the devices support. These device drivers may export a device property to indicate that the device may be power managed. The contents of the PM Device Tree 228 may include information specific to each power manageable device, including a time stamp property indicating when a device was last accessed.

After creating the PM Device Tree 228, the OS PM Manager 226 traverses the PM Device Tree 228 periodically. When traversing the PM Device Tree 228, the OS PM Manager 226 obtains a time stamp associated with each driver and may trigger power management events according to the system's power management policy. Thus, the OS PM Manager 226 is an event producer, the drivers are event consumers and the PM Service Agent 224 is a broker.

The PM Device Tree 228 implicitly preserves the hierarchy and physical dependency of devices because it is a subset of the system device tree. A device has a physical dependency if one or more devices are attached below it on a set of interconnected buses. Lower level devices in the hierarchy must be suspended and shut down properly before a higher level device can be shut down.

The PM Device Handler 230 receives power management requests from the PM Service Agent 224 and handles the requests by implementing a specific power control. The specific power control implementation for the device depends on the hardware and power characteristics of the device to be controlled. For example, in an embodiment consistent with the present invention, an interface may contain at least a time stamp, a property to indicate whether the device is power manageable, and methods such as get power level and set power level, suspend, resume, and power off. The time stamp records the last device access time, which may be used for measuring device idle time.

The optional power management Graphical User Interface (GUI) 204 may enable a user to access power management information as well as to tailor system power management policy. A secured application level power manager program may be added to allow users to customize power management policy and to pass the information to the OS PM Manager 226.

Power States

Figure 3:
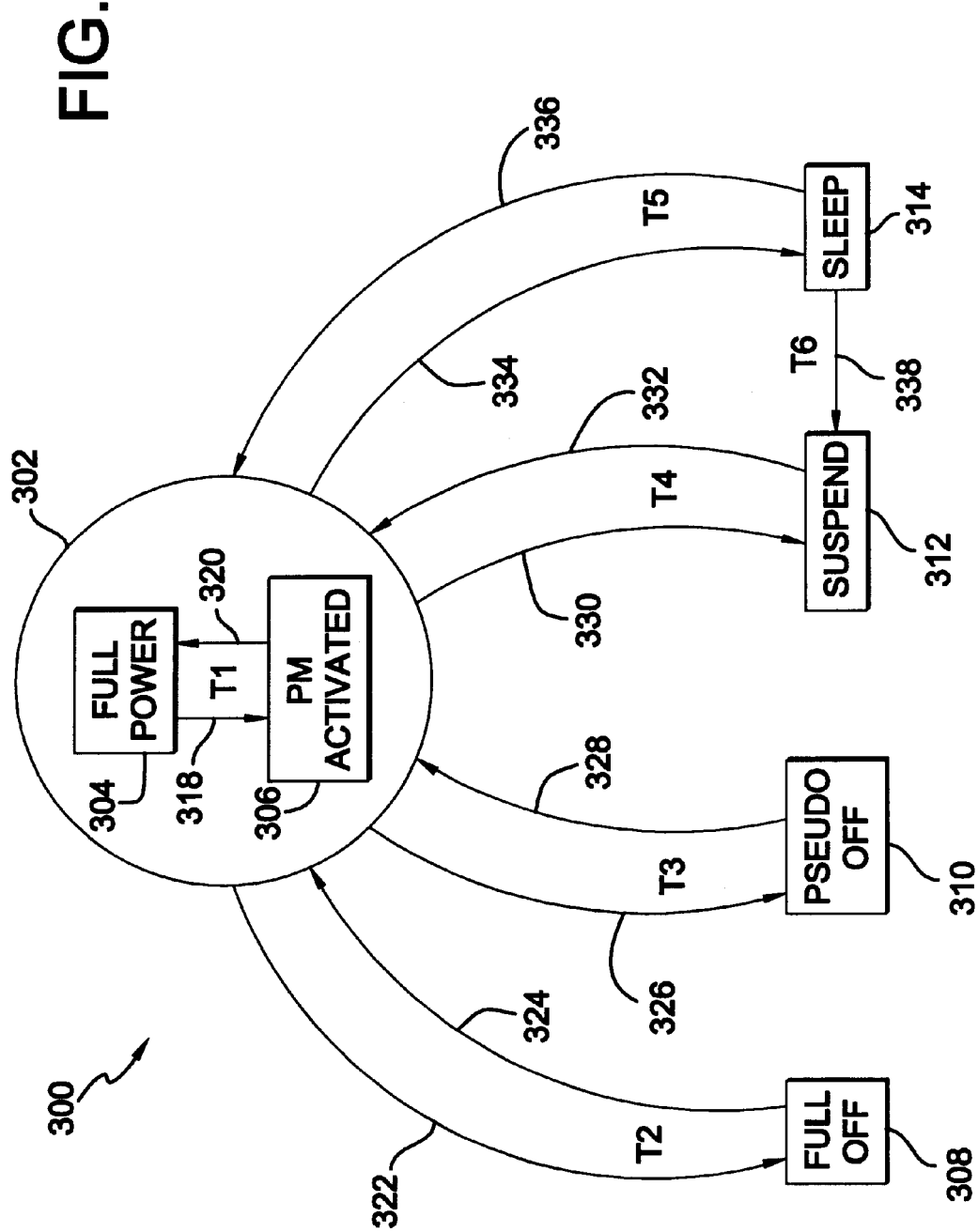
FIG. 3 is a state diagram showing power states in an embodiment of the present invention.

FIG. 3 is a state diagram 300 illustrating power states implemented by an embodiment of a method and apparatus that performs power management consistent with the present invention. These power states may include system power states 304–314. System power states 304–314 are platform independent power states. Power states 304 and 306 are classified as OS Active States because the OS is fully operational while the system is in either of these states. State transitions T1–T6, shown by arrows 318–338, define the transitions between the various power states in an embodiment consistent with the present invention.

Operating system (OS) Active states 302 include Full Power state 304 and Power Management (PM) Activated state 306. The system is in Full Power state 304 when there is no power management enabled. No special hardware is required to implement the Full Power 304 state. When power management is enabled, the system may go into the PM Activated state 306, where power consumption may be actively regulated by power management software. Devices may not be active at all times due to power management, but no system functionality is lost. Unlike the Full Power 304 state, the PM Activated state 306 requires power manageable devices.

A system may transition between the Full Power state and PM Activated state dynamically based on power management policy or user input. Transition T1, shown by arrows 318 and 320, indicates the transition of states between the Full Power state 304 and the PM Activated state 306. Arrow 318 shows a transition from Full Power state 304 to PM Activated state 306. Arrow 320 shows a transition from PM Activated state 306 to Full Power state 304.

Transition T2, shown by arrows 322 and 324, indicate the transitions between the OS Active states 302 and the Full Off state 308. Arrow 322 shows the transition from the OS Active states 302 to the Full Off state 308. Arrow 324 shows the transition from the Full Off state 308 to the OS Active states 302. When the system transits 322 from the OS Active states 302 to the Full Off state 308, no system or memory context are preserved.

Transition T3, shown by arrows 326 and 328, indicate the transitions between the OS Active states 302 and the Pseudo off state 310. Pseudo off state 310 may apply to systems containing power supply control circuitry that is separate from the main system power control logic. This separate power supply control circuitry is mainly for monitoring changes in the battery status. In this state, the system appears to be off to the users because there is no power to the system and hardware devices except for the power supply control circuitry.

Arrow 326 shows the transition from the OS Active states 302 to Pseudo off state 310. Arrow 328 shows the transition from the Pseudo off state 310 to the OS Active states 302.

Transition T4, shown by arrows 330 and 332, indicate the transitions between the OS Active states 302 and Suspend state 312. The system is in the Suspend state 312 when the memory image and hardware state are saved to nonvolatile backing storage, for example a disk. At this point, power to the main system is removed. This may include power to the CPU, memory and peripherals. Power supply control circuitry, if included in the system, is usually kept on but the power consumption of this circuitry is typically very low. The purpose of the power supply control circuitry is to monitor system and battery power status. The time for the system to recover to the working state is relatively long but no reboot is required. Non-volatile backing storage, for example a disk, should be available to save the memory image and hardware state. Arrow 330 shows the transition from the OS Active states 302 to Suspend state 312. Arrow 332 shows the transition from Suspend state 312 to the OS Active states 302.

Transition T5, shown by arrows 334 and 336, indicate the transitions between the OS Active states 302 and Sleep state 314. Sleep state 314 is the state at which power savings may be achieved by removing power from or placing into a low power modes as much of the system as possible. The goal of the Sleep state 314 is to resume normal system activities in a minimal time. The Sleep state 314 may be used to implement an "Instant On" feature. "Instant On" is usually achieved by preserving system state in memory such as self-refresh DRAM or battery-backed SRAM while the rest of the system is powered off. Power consumption in the Sleep state 314 is very low. Resumption of full system functionality is not instantaneous because some devices may need to be reinitialized. Arrow 334 shows the transition from the OS Active states 302 to Sleep state 314. Arrow 336 shows the transition from Sleep state 314 to the OS Active states 302.

The system or user may define a power management policy to have the system enter the Suspend state 312 from the Sleep state 314 after the system has been in the Sleep state 314 for a certain period of time. Transition T6, shown by arrow 338, indicates the transition from Sleep state 314 to Suspend state 312.

The relative order of power consumption of the system power states, from highest power to lowest power, is as follows: Full Power 304, PM Activated 306, Sleep 314, Suspend 312, Pseudo Off 310, and Full Off 308.

ACPI Compatibility

The power states of FIG. 3 may be mapped to platform dependent power states such as those defined by the Advanced Configuration and Power Interface (ACPI) initiative in order to provide compatibility with existing systems.

ACPI provides power state transition definitions which are dependent on the x86 processor, Windows operating system and the Windows BIOS. The ACPI initiative defines the following sets of platform-specific states: Global states G0–G3, Sleep states S1–S5, Processor states C0–C3, and Device states D0–D3. For example, the global states may be mapped to the OS Active states (G0), Suspend (G1), Sleep (G1), Pseudo Off (G2), and Full Off (G3). The Sleep states may be mapped to Suspend (S4) and Sleep (S1, S2, S3).

Power Management Method

Figure 4:
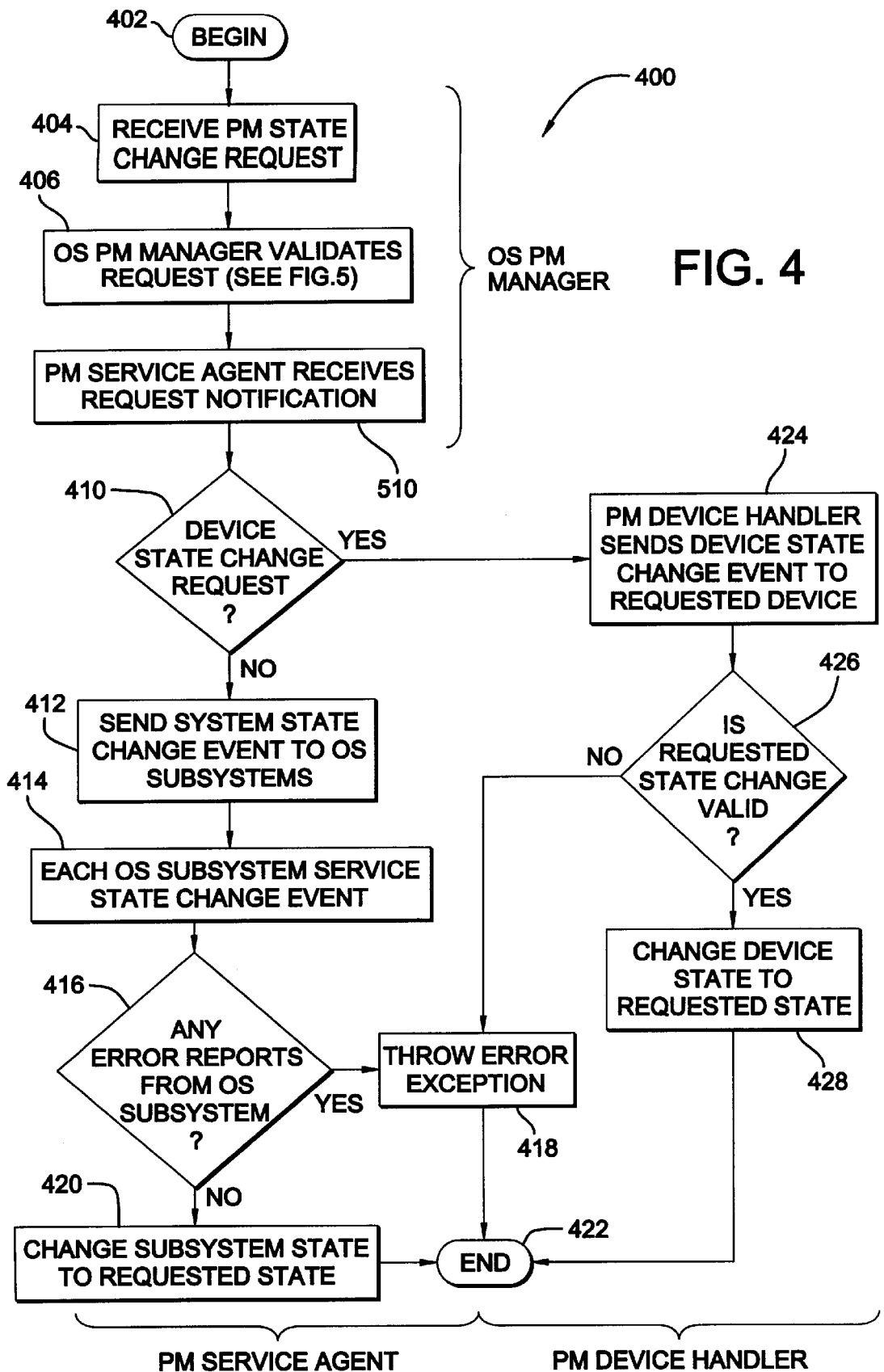
FIG. 4 is a flow chart showing a method for performing power management in an embodiment of the present invention.

FIG. 4 is a flow chart 400 illustrating a method consistent with an embodiment of the present invention for performing power management. The method is performed by the power management component 212 and begins at step 402. In step 404, a PM state change request is received. This state change request may be initiated by a call from the power management API 214 or from a power management GUI 204. The state change may be any of the transitions T1–T5 described above in the description of FIG. 3. The OS PM Manager 226 validates the state change request in step 406. Step 406 (See FIG. 5) includes steps taken by the OS PM Manager 226 in validating the state change request, shown by the flow chart 406 of FIG. 5 which is described below. In step 510, the PM Service Agent 224 receives a state change request notification. Then in step 410, the state change request is checked to determine whether it is a device state change request or a system state change request.

In step 410, if the PM Service Agent 224 determines that the state change request is for a system state change and not for a device state change, then the PM Service agent 224 sends the system state change event to all appropriate OS subsystems in step 412. OS subsystems may include memory, run queues, the scheduler, virtual memory management, the I/O subsystem and the file subsystem. System power states include Full Power 304, PM Activated 306, Sleep 314, Suspend 312, and Full Off 308, and are discussed above in connection with FIG. 3. Then in step 414, each OS subsystem services the state change event. In step 416, the PM Service Agent 224 may check for error reports from the OS subsystem. If an error report is received, then the PM Service Agent 224 throws an error exception in step 418 to abort the state transition, and the OS PM Manager 226 may notify the user of the error. If no error report is received, then the state of the system is changed to the requested state in step 420, and then the method ends in step 422.

If in step 410 the PM Service Agent 224 determines that the state change request is for a device state change and not for a system state change, then a PM Device Handler 230 sends the device state change event to the requested device in step 424. In step 426, the device driver of the requested device checks to determine whether the requested state change is valid. If the state change is valid, then the device driver changes the device state to the requested state in step 428 and the method ends at step 422. The device state requested will be one of the ACPI device states D0, D1, D2 or D3. If the requested state is not valid, then the device driver throws an error exception in step 418 and the method ends at step 422.

Figure 5:
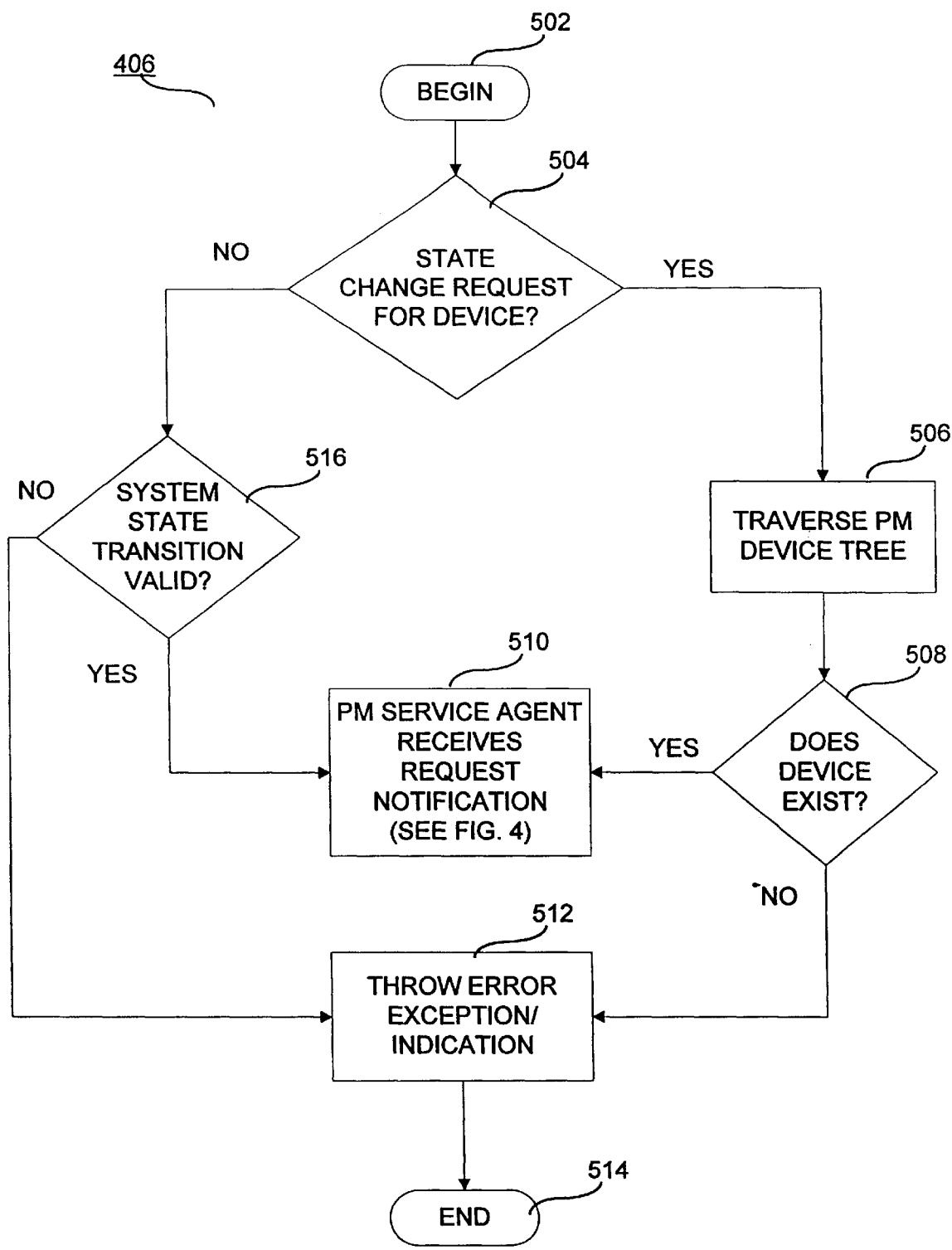
FIG. 5 is a flow chart showing a method for performing power management in an embodiment of the present invention.

FIG. 5 is a flow chart 406 showing steps taken by OS PM Manager 226 to validate the state change request, starting at step 502. First, the OS PM Manager 226 checks whether the state change request is for a device in step 504. If not, then the state change request is assumed to be a system state change request and the OS PM Manager 226 checks whether the system state transition is valid at step 516. The validity of the system state transition depends on the hardware implementation of the system. If the system state transition is valid then the PM Service Agent 224 receives a request notification at step 510 and processing continues at step 410 in the flow chart 400 of FIG. 4. If the PM Manager 226 determines that the system state transition is not valid then the PM Manager 226 throws an error exception/indication in step 512 and the method ends at step 514.

If the state change is associated with a device, then the OS PM Manager 226 traverses the PM Device Tree at step 506. Then in step 508 the OS PM Manager 226 checks to determine whether the device exists. If the OS PM Manager determines that the device exists then the PM service agent 224 receives a request notification at step 510 and processing continues at step 410 of flow chart 400. If the OS PM Manager 226 determines that the device does not exist then the OS PM Manager 226 throws an error exception in step 512 and processing ends at step 514.

In summary, the invention relates to a method and apparatus for performing power management in a Java operating environment. The method includes the step of receiving a state change request having a value and a type, wherein the value is associated with a power management state, and the type is for the system or for a device. The method also includes the step of determining the type of the state change request, processing the request in accordance with the state change request type, and changing the power management state in accordance with the processed request.

Other embodiments be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for performing power management in a Java operating system environment, comprising:

receiving a state change request having a value and a type, wherein the value is associated with a power management state, and the type is one of a system or a single device, wherein the change request is initiated by one of an internal power management source and an external power management source;

determining the type of the state change request;

processing the request in accordance with the state change request type; and changing the power management state in accordance with the processed request.

2. The method of claim 1, wherein the power management state includes one of a Full Power state, a PM activated state, a Full Off state, a Pseudo Off state, a Suspend and a Sleep state.

3. The method of claim 1, wherein the step of determining the type of the state change request further includes validating the state change request.

4. The method of claim 1, wherein the internal power management source is an application programming interface and the external power management source is a graphical user interface.

5. A computer program product, comprising a computer readable medium having computer code embodied therein for performing power management in a Java operating system environment the computer program product including:

computer readable program code devices configured to receive a state change request having a value and a type, wherein the value is associated with a power management state, and the type is one of a system or a single device, wherein the change request is initiated by one of an internal power management source and an external power management source;

computer readable program code devices configured to determine the type of the state change request;

computer readable program code devices configured to process the request in accordance with the state change request type; and computer readable program code devices configured to change the power management state in accordance with the processed request.

6. The computer program product of claim 5, wherein the power management state includes one of a Full Power state, a PM activated state, a Full Off state, a Pseudo Off state, a Suspend and a Sleep state.

7. The computer program product of claim 5, wherein the computer readable program code devices configured to determine the type of the state change request further include computer readable program code devices configured to validate the state change request.

8. The computer program product of claim 5, wherein the internal power management source is an application programming interface and the external power management source is a graphical user interface.

9. An apparatus for performing power management in a Java operating system environment, comprising:

means for receiving a state change request having a value and a type, wherein the value is associated with a power management state, and the type is one of a system or a single device, wherein the change request is initiated by one of an internal power management source and an external power management source;

means for determining the type of the state change request;

means for processing the request in accordance with the state change request type; and means for changing the power management state in accordance with the processed request.

10. The apparatus of claim 9, wherein the power management state includes one of a Full Power state, a PM activated state, a Full Off state, a Pseudo Off state, a Suspend and a Sleep state.

11. The apparatus of claim 9, wherein the means for determining the type of the state change request further includes means for validating the state change request.

12. The apparatus of claim 9, wherein the internal power management source is an application programming interface and the external power management source is a graphical user interface.

13. An apparatus for performing power management in a Java operating system environment, comprising:

circuitry configured to receive a state change request having a value and a type, wherein the value is associated with a power management state, and the type is one of a system or a single device, wherein the change request is initiated by one of an internal power management source and an external power management source;

circuitry configured to determine the type of the state change request;

circuitry configured to process the request in accordance with the state change request type; and circuitry configured to change the power management state in accordance with the processed request.

14. The apparatus of claim 13, wherein the power management state includes one of a Full Power state, a PM activated state, a Full Off state, a Pseudo Off state, a Suspend and a Sleep state.

15. The apparatus of claim 13, wherein the circuitry configured to determine the type of the state change request further includes circuitry configured to validate the state change request.

16. The apparatus of claim 13, wherein the internal power management source is an application programming interface and the external power management source is a graphical user interface.

17. A power management component for managing power in a Java operating system environment, comprising:

an OS PM Manager for detecting a state change request for a system or for a peripheral device within the system, wherein the state change indicates a change in the power management state associated with the system or the peripheral device;

a PM Service Agent for servicing the state change; and a PM Device Handler for applying the state change to each peripheral device.

18. The power management component of claim 17, further comprising a PM Device Tree, wherein the PM Device Tree keeps track of each power manageable peripheral device.

19. The power management component of claim 17, wherein the power management state includes one of a Full Power state, a PM activated state, a Full Off state, a Pseudo Off state, a Suspend and a Sleep state.

* * * * *